A. J. CROSS.
BIFOCAL LENS.
APPLICATION FILED DEC. 19, 1913.
1,102,008.
Patented June 30, 1914.
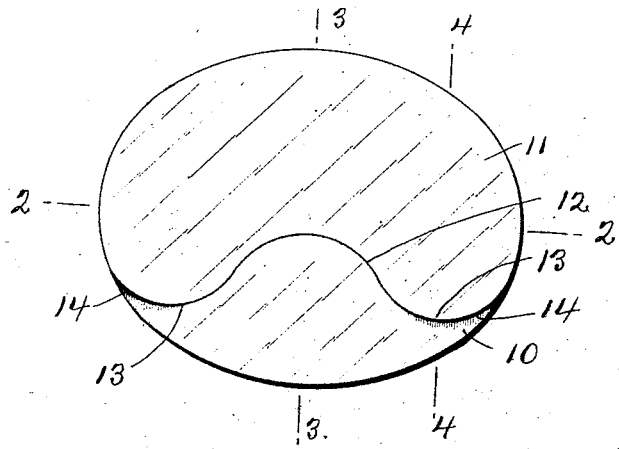
Fig: 1.
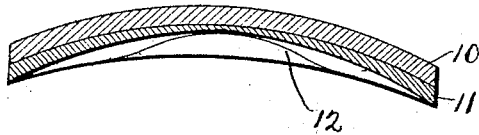
Fig: 2.
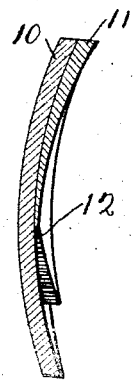
Fig: 3.
Fig: 4.
Witnesses:
Arthur G. Dannell
M. S. O'Donnell
Andrew Jay Cross, Inventor,
By his Attorney,
W. B. Hutchinson

UNITED STATES PATENT OFFICE.

ANDREW JAY CROSS, OF NEW YORK, N. Y.

BIFOCAL LENS.

1,102,008.

Specification of Letters Patent. Patented June 30, 1914.

Application filed December 19, 1913. Serial No. 807,570.

*To all whom it may concern:*

Be it known that I, ANDREW JAY CROSS, a citizen of the United States, and a resident of the city, county, and State of New York, have invented a new and useful Improvement in Bifocal Lenses, of which the following is a full, clear, and exact description.

My invention relates to improvements in bifocal lenses, and the general object of my invention is to produce a bifocal lens for glasses and spectacles which is of simple construction, graceful appearance, and in which the close vision or reading member of the lens has a much greater area than usual in bifocal lenses, this being accomplished in a way which does not appreciably reduce the distance area of the lens.

Heretofore the general practice in the construction of bifocal lenses has been to cement or fasten to the distance glass a positive segment which provides the close vision or reading member of the lens. This positive or close vision segment has been constructed in a single curve, for the reason that mechanical difficulties of grinding are so great as to render it practically impossible to give to the added segment a shape which would result in a compound curve, and give to the lower edge of the glass or close vision segment a substantially wider vision. Where lenses are made, however, as disclosed in Letters Patent of the United States No. 1,063,421, issued to me on the 3rd of June, 1913, it is comparatively easy to give this wider area to the reading or close vision member, and it is also possible to accomplish this result, though not in so perfect a manner, by what is called solid grinding, that is by grinding a single glass so that the major or upper portion shall be adapted for distance vision, and the lower portion for close vision. I have found that by leaving the middle portion of the close vision member substantially as usual, but by widening the exposed portion of said member at its lower edge, very satisfactory results are obtained, and the user of the lens has a much wider range of vision through the close vision member than has heretofore been possible. This makes the glasses in which such lenses are used, far more comfortable and efficient, especially when the lenses are monocentric, as disclosed in my patent above referred to.

Reference is to be had to the accompanying drawings forming a part of this specification, in which similar reference characters indicate corresponding parts in all the views.

Figure 1 is an inside elevation of a lens showing my improvement. Fig. 2 is a longitudinal section on the line 2—2 of Fig. 1. Fig. 3 is a cross section on the line 3—3 of Fig. 1, and Fig. 4 is a cross section on the line 4—4 of Fig. 1.

Where the lens is made in two pieces, the close vision member 10 is made the full size of the glass or lens, and the negative member 11 which is combined with the member 10 to produce the distance lens, is cut away or has a portion removed at its lower edge as shown at 12, this being curved up in the center to provide the necessary close vision area, and the exposed part of the member 10 is widened or curved away at the upper edge as at 13, terminating in an up curve which gives to the exposed lower part or close vision member of the lens a much wider area than usual, and this it will be seen is done without appreciably reducing the distance vision portion of the lens. This also gives to the lens a handsomer appearance than usual, and commercially this is desirable because many people object to the appearance of bifocal lenses.

It will be readily seen that to grind a segment corresponding to the shape of the exposed lower portion of the member 10 in Fig. 1, especially where this is a positive segment and adapted to be secured to a distance lens as usual, would be practically impossible, owing to the mechanical difficulties of actually grinding and affixing a member of such shape, but it is a very simple matter to cut the lower edge of the member 11 of the lens disclosed, and if the lens is made in a single piece, a tool can be devised for shaping the lens as described.

It will be noticed by reference to Fig. 1, that the construction disclosed gives substantially the same distance area to the lens as is secured in ordinary bifocals, while the close vision area is much greater, and especially much wider, which is very desirable.

In the construction which I have shown and described, it will be noted that the exposed surface or close vision surface of the member 10 is depressed rather than raised, as in a case where the segments are added, and the member 11 is thinnest at its principal axis, and grows thicker toward the ends of the member. This, as stated, leaves the close vision exposure in the form of a depression, and makes it possible to have the principal axes of the two members 10 and 11 coincident, in other words to make the complete lens monocentric, and it also leaves the advantageous overhang noted in my prior patent, which prevents the dust line at the edge of the close vision segment.

I claim:—

1. As an improved article of manufacture, a bifocal lens having the lower or close vision member shaped with its upper edge in the form of a compound curve, highest in the center, and extending downward and outward at the sides in a manner to leave an uninterrupted field along the entire lower portion of the lens.

2. As an improved article of manufacture, a bifocal lens having its lower or close vision member highest in the center, and with its upper edge curving downward, outward, and finally upward, thereby leaving the whole lower edge portion of the lens clear and adapted for close vision.

3. A bi-focal lens comprising a complete member forming the close vision portion of the lens, and an incomplete member superimposed on the complete member, the incomplete member having its lower edge portion formed in the shape of a compound curve, highest in the center, and curving downward, outward and upward at the sides, thereby leaving a clear field for the close vision member along the entire lower portion of the complete lens.

ANDREW JAY CROSS.

Witnesses:
WARREN B. HUTCHINSON,
ARTHUR G. DANNELL.